(12) United States Patent
Sakurada

(10) Patent No.: US 9,802,412 B2
(45) Date of Patent: Oct. 31, 2017

(54) IMAGE RECORDING METHOD AND SET

(71) Applicant: CANON KABUSHIKI KAISHA, Tokyo (JP)

(72) Inventor: Shinichi Sakurada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/310,002

(22) Filed: Jun. 20, 2014

(65) Prior Publication Data

US 2015/0009268 A1    Jan. 8, 2015

(30) Foreign Application Priority Data

Jul. 3, 2013 (JP) .................................. 2013-139502

(51) Int. Cl.
*B41J 2/21* (2006.01)
*B41J 2/17* (2006.01)
*C09D 11/322* (2014.01)
*C09D 11/40* (2014.01)
*C09D 11/54* (2014.01)

(52) U.S. Cl.
CPC ............... *B41J 2/17* (2013.01); *B41J 2/2107* (2013.01); *C09D 11/322* (2013.01); *C09D 11/40* (2013.01); *C09D 11/54* (2013.01)

(58) Field of Classification Search
CPC ... C09D 11/005; C09D 11/033; C09D 11/037; C09D 11/38; C09D 11/40; C09D 11/36; C09D 11/30; C09D 11/322; C09D 11/328; C09D 11/101; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41M 5/0011;

(Continued)

(56) References Cited

U.S. PATENT DOCUMENTS

2005/0174411 A1* 8/2005 Adachi ................ B41M 7/0018
347/100
2006/0061643 A1* 3/2006 Furukawa .............. B41J 2/2114
347/101

(Continued)

FOREIGN PATENT DOCUMENTS

JP   H10-216739 A   8/1998
JP   2004-10633 A   1/2004

OTHER PUBLICATIONS

"Testing Method for Liquid Absorbability of Paper and Paperboard," Japan Tappi Journal, No. 51, 2000.

(Continued)

*Primary Examiner* — Manish S Shah
(74) *Attorney, Agent, or Firm* — Fitzpatrick, Cella, Harper & Scinto

(57) ABSTRACT

An image recording method including the steps of applying a liquid composition to a recording medium and applying an ink containing a pigment to the recording medium so as to overlap at least with a part of a region of the recording medium to which the liquid composition is applied. The water absorption amount of the recording medium at a contact time of 1 second according to the Bristow's method is 15 ml/m$^2$ or less. The ink contains a compound having a polyoxyalkylene unit. The liquid composition contains a tannin compound.

10 Claims, 2 Drawing Sheets

(58) Field of Classification Search
CPC .... B41M 5/0017; B41M 7/00; B41M 7/0072; B41M 5/52; B41M 5/5218
USPC .............. 347/7, 14, 21, 95, 96, 98, 100, 103
See application file for complete search history.

(56) References Cited

U.S. PATENT DOCUMENTS

| | | | | |
|---|---|---|---|---|
| 2008/0239045 | A1* | 10/2008 | Umebayashi | C09D 11/101 347/102 |
| 2010/0098878 | A1* | 4/2010 | Tsubaki | C09D 11/38 427/552 |
| 2012/0127248 | A1* | 5/2012 | Koganehira | B41J 2/2114 347/102 |
| 2012/0287200 | A1* | 11/2012 | Yano | B41J 2/2114 347/20 |
| 2013/0141498 | A1 | 6/2013 | Mori et al. | |
| 2013/0141503 | A1 | 6/2013 | Kobayashi et al. | |

OTHER PUBLICATIONS

Shigenori Kuga, et al., "Development and application of dynamic scanning absorptometer—Automation and improvement of Bristow measurement -", Japan Tappi Journal, No. 48, May 1994, pp. 88-92.

* cited by examiner

IMAGE RECORDING METHOD AND SET

BACKGROUND OF THE INVENTION

Field of the Invention

The present invention relates to an image recording method and a set.

Description of the Related Art

Although an ink jet technique has been applied to the field of office printers or home printers, there has been a demand for realizing POD (print on demand) in recent years, and its application to a field of commercial printing is expected. In this commercial printing field, feeling of printing like that of general-purpose printing paper is required. As a printing method for obtaining an image similar to a printed article having feeling of printing, a method of directly recording an image on a recording medium has been proposed. In addition, there has been proposed a method of first forming an intermediate image on an intermediate transfer member by an ink jet device and then transferring the intermediate image on the intermediate transfer member to a desired recording medium to form a final image (transfer ink jet printing method).

On the other hand, there is a demand for a technique capable of recoding at a higher speed than before. In this respect, it is known to enable image recording at a high speed by aggregating an ink. According to this method, a polyvalent metal salt or an acidic buffer solution is used to cause an aggregation reaction between these substances and an anionic composition contained in the ink, thereby forming an aggregate product.

Japanese Patent Application Laid-Open No. 2004-10633 discloses an ink set for ink jet recording which contains an ink containing a pigment and a liquid composition for aggregating the ink, wherein one of the ink and the liquid composition is made alkaline, and the other is made acidic. Besides the aggregation method utilizing a neutralization reaction between an acid and an alkali, Japanese Patent Application Laid-Open No. H10-216739 discloses that a nonionic compound which is a surfactant having a polyoxyalkylene unit is aggregated with tannic acid.

SUMMARY OF THE INVENTION

The present inventors have verified an effect to improve an image quality on a poorly-permeable or non-permeable recording medium by using the method disclosed in Japanese Patent Application Laid-Open No. 2004-10633. As a result, it has been proved that the following problem is caused. That is, it has been found that when the liquid composition is applied to the poorly-permeable or non-permeable recording medium to form an image by an ink jet recording method, such a new problem that an ink aggregate shrinks on the poorly-permeable or non-permeable recording medium to deform the image is caused.

Accordingly, it is an object of a present invention to provide an image recording method capable of forming a high-quality image without deforming the image by shrinkage of an ink aggregate formed on a poorly-permeable or non-permeable recording medium.

According to the present invention, there is provided an image recording method comprising the steps of applying a liquid composition to a recording medium and applying an ink containing a pigment to the recording medium so as to overlap at least with apart of a region of the recording medium to which the liquid composition is applied, wherein a water absorption amount of the recording medium at a contact time of 1 second according to the Bristow's method is 15 ml/m$^2$ or less, the ink contains a compound having a polyoxyalkylene unit, and the liquid composition contains a tannin compound.

According to the present invention, there is also provided a set of an ink and a liquid composition, wherein the ink contains a pigment and a compound having a polyoxyalkylene unit, and the liquid composition contains a tannin compound.

According to the present invention, there can be provided an image recording method and a set, by which a high-quality image can be formed without deforming the image by shrinkage of an ink aggregate formed on a poorly-permeable or non-permeable recording medium.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An image recording method according to an embodiment of present invention includes the steps of applying a liquid composition to a recording medium and a step of applying an ink containing a pigment to the recording medium so as to overlap at least with apart of a region of the recording medium to which the liquid composition is applied. The recording medium is poorly-permeable or non-permeable. Incidentally, when a water absorption amount of a recording medium at a contact time of 1 second according to the Bristow's method is 15 ml/m$^2$ or less, such a recording medium is defined as a poorly-permeable or non-permeable recording medium in the claims and the present specification. The ink contains a compound having a polyoxyalkylene unit. The liquid composition contains a tannin compound.

The liquid composition is applied to the poorly-permeable or non-permeable recording medium as described above to bring the liquid composition into contact with the ink, whereby a high-quality image can be formed because an ink aggregate does not shrink, and so the resultant image does not deform.

The reason for this is not clearly known. However, the present inventors infer the reason as described below. The reason why the shrinkage of the image does not occur when the ink contains the compound having the polyoxyalkylene unit is considered to be attributable to an aggregation form of the ink.

Figure 1A:
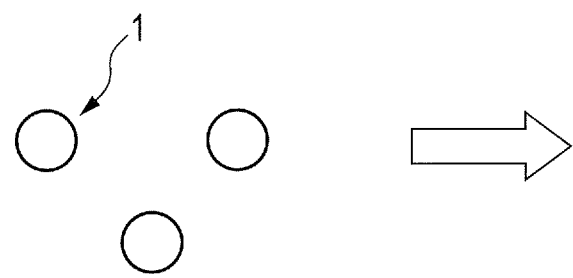
FIGS. 1A and 1B typically illustrate a process of aggregation of a pigment dispersoid in a prior example.
Figure 1B:
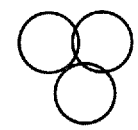

That is, when an aggregation reaction occurs between an ink and an organic acid in the prior art, an anionic dispersion group of an ink component causes protonation by a proton donated by a carboxyl group of the organic acid to lose the charge. Pigment dispersoids thereby lose repulsive force of charge repulsion, thus leading to an association or aggregation form by intermolecular force. When existing pigment dispersoids 1 lose the charge as illustrated in FIG. 1A to cause aggregation, the pigment dispersoids 1 closely aggregate. As a result, rapid volume shrinkage occurs (FIG. 1B). At this time, on a recording medium, a solvent in the ink and an applied treatment liquid are present between the ink aggregate product and the recording medium. Therefore, adhesion force between the ink aggregate product and the recording medium is weak, and shrinking force produced by the volume shrinkage exceeds the adhesion force between the ink aggregate product and the recording medium to cause shrinkage of an ink image on the recording medium.

Figure 2A:
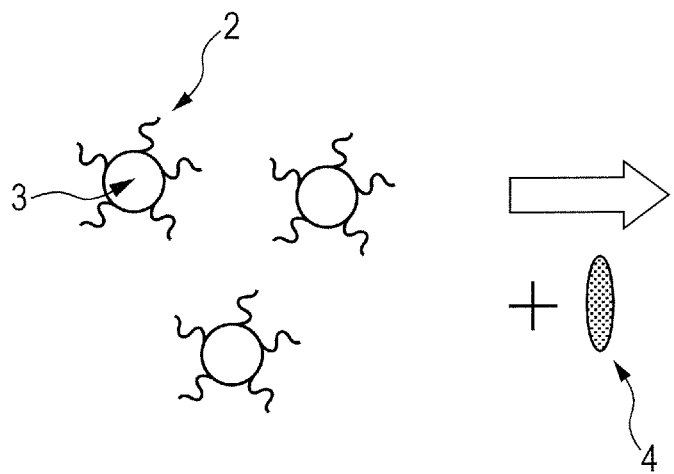
FIGS. 2A and 2B typically illustrate a process of aggregation of a pigment dispersoid in an embodiment of present invention.
Figure 2B:
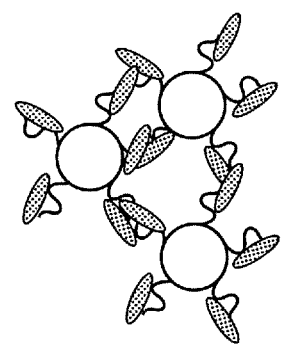

In comparison with this, a pigment in the ink is dispersed by hydration of a polyoxyalkylene unit 2 as illustrated in FIG. 2A in the image recording method according to an embodiment of the present invention, and the dispersed state is retained by steric repulsion between dispersoids 3. Therefore, the dispersoids are not aggregated by an organic acid used in an ordinary image recording method. However, the compound having the polyoxyalkylene unit specifically forms an association product together with a tannin compound 4 as illustrated in FIG. 2B not to cause hydration, thereby forming an aggregate. When the aggregation occurs in a state where the polyoxyalkylene unit has associated with the tannin compound, a space can exist between the pigment dispersoids as illustrated in FIG. 2B. Consequently, almost no volume shrinkage thereof occurs, though aggregation of the ink occurs, so that an ink image does not shrink. Incidentally, when a permeable recording medium is used, a solvent in the ink and the liquid composition are absorbed without remaining on the recording medium, so that image shrinkage by an ink aggregate product does not occur.

Respective steps and materials used in the image recording method according to the embodiment of present invention will hereinafter be described in detail.

Compound Having Polyoxyalkylene Unit:

The compound having the polyoxyalkylene unit is a compound having a structure represented by the following general formula:

In the general formula, x and y are individually a positive integer. $(C_xH_{2x}O)_y$, which is a group contained in the compound having the polyoxyalkylene unit, may be one kind or plural kinds different from each other. When x is 3 or more, the $C_xH_{2x}$ moiety may be linear or branched.

The compound having the polyoxyalkylene unit favorably contains a moiety of ethylene oxide or propylene oxide, or a copolymer moiety of ethylene oxide and propylene oxide.

The polyoxyalkylene unit is more favorably at least one unit selected from the group consisting of the following general formulae (1) to (7).

 (1),

 (2),

 (3),

 (4),

 (5),

 (6), and

 (7).

In the general formulae (1) to (7), n is an integer of 5 to 60, and a and b are individually a positive integer.

As examples of the compound having the polyoxyalkylene unit, polyoxyethylene alkyl ether, polyoxyethylene alkyl ether salts and acrylic resins may be mentioned. As specific examples of a sulfuric ester type, HITENOL: 227L, 325LLA-10, LA-12 and LA16 (all, products of DAI-ICHI KOGYO SEIYAKU CO., LTD), which are polyoxyethylene lauryl ether sulfates, may be mentioned. Specific examples of a phosphoric ester type include PLYSURF: A208B, A210B and A219B (all, products of DAI-ICHI KOGYO SEIYAKU CO., LTD), which are polyoxyethylene lauryl ether phosphates. As examples of a carboxylic acid type, NEO-HITENOL: ECL-30S and ECL-45 (both, products of DAI-ICHI KOGYO SEIYAKU CO., LTD), which are polyoxyethylene lauryl ether acetates, may be mentioned. Besides the above, NIKKOL BC-20 20V, NIKKOL BC15, NIKKOL BC5.5, NIKKOL BO50 and AKYPO RLM100 (all, products of NIKKO CHEMICALS CO., LTD.) may be mentioned.

As an example of the compound having the polyoxyalkylene unit, polyethylene glycol may be mentioned. Polyethylene glycol is favorably that having a weight-average molecular weight of 250 or more and 60,000 or less and more favorably that having a weight-average molecular weight of 3,000 or more and 10,000 or less.

The compound having the polyoxyalkylene unit may be obtained by polymerizing a monomer containing the polyoxyalkylene unit. As examples of the monomer containing the polyoxyalkylene unit, polyethylene glycol monomethacrylate (BLENMER PE-350; product of NOF CORPORATION), polypropylene glycol monomethacrylate (BLENMER PP-500; product of NOF CORPORATION) and methoxy polyethylene glycol methacrylate (M230G; product of Shin-Nakamura Chemical Co., Ltd.). may be mentioned The ink has the polyoxyalkylene unit at least in one component constituting the ink. For example, a dispersant may have the polyoxyalkylene unit. A pigment dispersoid may not contain a dispersant having the polyoxyalkylene unit. In this case, it is only necessary that the polyoxyalkylene unit is contained in any of a polymer fine particle dispersant, a water-soluble resin, a water-soluble organic solvent and a surfactant.

A polymer fine particle dispersant, a water-soluble resin, a water-soluble organic solvent and a surfactant each having the polyoxyalkylene unit will hereinafter be described in detail.

(a) Polymer Fine Particle Dispersant

A polymer fine particle dispersant dispersed by a dispersant having the polyoxyalkylene unit has an effect to aggregate a tannin compound. The polymer fine particle dispersant favorably has a form of an aqueous emulsion in which a polymer fine particle is dispersed in an aqueous solvent. In addition, the polymer fine particle favorably has a hydrophilic group on its surface and is inert to other components used in the ink. The polymer fine particle can be produced by an emulsion polymerization process in water in which an unsaturated vinyl monomer is polymerized with addition of a polymerization initiator and an emulsifier. As examples of the unsaturated vinyl monomer, (meth)acrylate monomers, aromatic vinyl monomers, vinyl ester monomers, vinyl cyanide compound monomers, halide monomers, olefin monomers and diene monomers may be mentioned. In addition, a polymer fine particle obtained by combining plural kinds of the above-mentioned monomers and polymerizing them may also be used, or plural kinds of polymer fine particle s each prepared by polymerizing a single monomer may also be used.

When the polymer fine particle contains a polyoxyalkylene unit, such a fine particle may be prepared according to the following processes:

A process in which a monomer having a polyoxyalkylene unit is emulsified together with another monomer in advance, and such monomers are copolymerized;

A process in which a polymer dispersant having a polyoxyalkylene unit is prepared in advance, and this polymer dispersant is used to conduct emulsion polymerization of monomers; and A process in which a surfactant having a polyoxyalkylene unit is used to conduct emulsion polymerization.

A polymerization initiator, an emulsifier, a surfactant, a molecular weight modifier and a neutralizer used when the polymer fine particle is prepared by the emulsion polymerization may be used according to a method known per se in the art. Such a polymer fine particle dispersant is used in the ink, whereby a high-quality image can be formed without causing image shrinkage on a recording medium.

The glass transition temperature of the polymer fine particle may be suitably selected from a wide range without particular limitation. However, the glass transition temperature is favorably −10° C. or more and 120° C. or less, more favorably 20° C. or more and 100° C. or less. The weight-average molecular weight of the polymer fine particle may be suitably selected from a wide range without particular limitation. However, the weight-average molecular weight is favorably 3,000 or more and 2,000,000 or less, more favorably 5,000 or more and 1,000,000 or less. The polymer fine particle dispersant has a dispersion particle diameter of desirably 10 nm or more and 1,000 nm or less, more desirably 100 nm or more and 500 nm or less.

These polymer fine particles are favorably added to the ink in a range of 0.5% by mass or more and 15% by mass or less in terms of solid content based on the total mass of the ink. If the content is less than 0.5% by mass, the effect to inhibit the image shrinkage on the recording medium may not be achieved in some cases. If the content exceeds 15% by mass, the ejection stability of the resulting ink from an ink jet head may be deteriorated in some cases.

(b) Water-Soluble Resin

The water-soluble resin may contain a polyoxyalkylene unit. A water-soluble resin having a polyoxyalkylene unit and a hydrophobic group has an effect to aggregate a tannin compound. The water-soluble resin may also be added to a water-soluble ink. When the water-soluble resin is added to the water-soluble ink, the water-soluble resin added favorably aggregates by becoming in contact with the liquid composition and is favorably anionic or nonionic. In addition, the water-soluble resin is favorably a copolymer composed of a hydrophobic monomer and a hydrophilic monomer. For example, the hydrophobic monomer is polymerized, whereby a hydrophobic group of the resulting water-soluble resin can be formed, and the hydrophilic monomer is polymerized, whereby water solubility can be imparted to the resin. In this case, the polyoxyalkylene unit may be contained in the hydrophobic monomer or the hydrophilic monomer, or in both monomers.

No particular limitation is imposed on the hydrophobic monomer usable for obtaining the water-soluble resin having the hydrophobic group, and any publicly known hydrophobic monomer may be used. As specific examples of the hydrophobic monomer, styrene, styrene derivatives, benzyl acrylate and benzyl methacrylate may be mentioned. Any publicly known hydrophilic monomer may be used as the hydrophilic monomer without particular limitation. As examples thereof, acrylic acid, methacrylic acid and maleic acid may be mentioned.

When the water-soluble resin has an acid value, the acid value of the water-soluble resin is favorably 50 mg KOH/g or more and 550 mg KOH/g or less. The weight-average molecular weight of the water-soluble resin is favorably 1,000 or more and 50,000 or less. Incidentally, the water-soluble resin is favorably added to the ink in a range of 0.1% by mass or more and 15% by mass or less in terms of solid content based on the total mass of the ink. When the water-soluble resin has a polyoxyalkylene unit, the number of polyoxyalkylene units in its molecule is favorably 5 or more and 60 or less, and such a water-soluble resin is favorably added to the ink in a range of 0.5% by mass or more and 15% by mass or less in terms of solid content based on the total mass of the ink. If the content is less than 0.5% by mass, the effect to inhibit the image shrinkage on the recording medium may not be achieved in some cases. If the content exceeds 15% by mass, the ejection stability of the resulting ink from an ink jet head may be deteriorated in some cases.

(c) Water-Soluble Organic Solvent

Water is often used as a main component of a solvent for the ink. However, a water-soluble organic solvent may be used for the purpose of imparting desired physical properties to the ink, preventing the ink from drying and improving the dissolution stability of the ink. The polyoxyalkylene unit may be contained in this water-soluble organic solvent. A water-soluble organic solvent having the polyoxyalkylene unit has an effect to aggregate a tannin compound. Such solvents may be used either singly or in any combination thereof together with water.

(d) Surfactant

The surfactant may be added into the ink mainly for the following purposes:

To adjust the surface tension of the ink to improve its penetrability into a recording medium; and To improve the wettability of the ink with respect to a head member of an ink jet printer to improve the ejection stability of the ink.

The amount of the surfactant added into the ink is favorably 0.01% by mass or more and 5.0% by mass or less, more favorably 0.1% by mass or more and 3.0% by mass or less.

A surfactant having a polyoxyalkylene unit has an effect to aggregate a tannin compound. When such a surfactant is used for the purpose of inhibiting the image shrinkage, the number of polyoxyalkylene units in its molecule is favorably 5 or more and 60 or less, and such a surfactant is favorably added to the ink in a range of 0.5% by mass or more and 15% by mass or less in terms of solid content based on the total mass of the ink. If the content is less than 0.5% by mass, the effect to inhibit the image shrinkage on the recording medium may not be achieved in some cases. If the content exceeds 15% by mass, the ejection stability of the resulting ink from an ink jet head may be deteriorated in some cases.

In addition, the surfactant may function as a pigment dispersant and a polymer fine particle dispersant in some cases. Even in this case, no problem is caused for achieving the effect of the present invention. Such surfactants may be used either singly or in any combination thereof.

Liquid Composition:

The liquid composition contains at least one tannin compound as an ink viscosity-increasing component. Here, the ink viscosity increasing means the case where a coloring material or a resin which is part of a composition constituting the ink comes into contact with the ink viscosity-increasing component to chemically react with the ink viscosity-increase component, thereby increasing the viscosity of the whole ink. The case where a local viscosity increase by aggregation of a part of an ink composition, such as a coloring material, is caused is also included, not limited to the above case.

The tannin compound has an effect to lower the flowability of a part of an ink and/or an ink composition on a recording medium, thereby inhibiting bleeding or beading upon the formation of an image and inhibiting the shrinkage of an image. That is, in the prior art, the ink application amount per unit area in image formation using an ink jet device may increase in some cases. In such a case, bleeding or beading, which is blurring or mixing of an ink, is easy to occur. However, in this embodiment, the liquid composition is applied to the recording medium, whereby the flowability of the ink is lowered when an image is formed with the ink. Accordingly, bleeding or beading is hard to occur, and shrinkage of the image does not occur either. As a result, the image is successfully formed and retained. In addition, aggregation of the ink occurs as described above. However, the volume shrinkage thereof scarcely occurs, so that shrinkage of the ink image is not caused.

Any conventionally known tannin compound may be used as the tannin compound. As examples of the tannin compound, a condensed tannin obtained by polymerizing a compound having a flavanol skeleton and a hydrolyzable tannin obtained by forming an ester linkage between an aromatic compound and a sugar such as glucose may be mentioned. As specific examples thereof, tannic acid, gallic acid, geraniin, ellagtannin, ellagic acid, cinnamtannin, epigallotannin, rosmarinic acid and caffeic acid may be mentioned.

These tannin compounds may be used in combination with an organic acid. When a content which loses hydration by an acidic pH is present in an ink, an acid buffer solution having a pH-buffering ability may be extremely favorably used as a solution containing the organic acid. Even when apparent concentration lowering of the liquid composition is caused by the ink, a change in pH can be lessened by this acid buffer solution, so that reactivity between the liquid composition and the ink is not lowered. Any organic acid may be used so far as it is conventionally known. Examples thereof include malonic acid, succinic acid and glutaric acid. These organic acid may be added to the liquid composition either singly or in any combination thereof.

More specifically, when the ink contains a pigment dispersed by an anionic group and a polymer fine particle having a polyoxyalkylene unit, the liquid composition favorably contains the tannin compound and the organic acid. In addition, the content of the tannin compound in the liquid composition is favorably 1/50 times or more and 30/1 times or less, more favorably 1/29 times or more and 29/1 times or less, particularly favorably 5/25 times or more and 25/5 times or less, in terms of mass ratio with respect to the content of the organic acid.

In addition to the organic acid, any conventionally known compound developing a buffer action to pH by addition thereof may be suitably used. The pH of the liquid composition is on an acidic side, that is, favorably 1 or more and 6 or less, more favorably 3 or more and 5 or less.

The liquid composition may contain a proper amount of water, an aqueous solvent and/or an organic solvent. A mixed solvent of water and a water-soluble organic solvent may be used as the aqueous solvent. No particular limitation is imposed on the water-soluble organic solvent, and any publicly known water-soluble organic solvent may be used. Specific examples thereof include glycerol, ethanol, methanol, 2-propanol and 2-pyrrolidone. Besides the above components, an antifoaming agent, an antiseptic, a mildewproofing agent and the like may be suitably added to the liquid composition, as needed, to cause a liquid composition to have desired properties.

In order to improve transferability or improve fastness properties of a finally formed image, various kinds of resins may be added to the liquid composition. Such a resin is added, whereby adhesion properties to a recording medium upon transferring can be made good, and the mechanical strength of an ink film can be improved. In addition, improvement in water resistance of an image is also expected according to the kind of the resin. No particular limitation is imposed on a material used as the resin so far as it can coexist with the tannin compound. For example, an organic polymer such as polyvinyl alcohol or polyvinyl pyrrolidone may be favorably used. In addition, a resin which reacts with a component contained in an ink to cause crosslinking is also favorable. As examples thereof, oxazoline and carbodiimide which react with a carboxylic acid, frequently used for dispersing a coloring material in the ink, to cause crosslinking may be mentioned. These resins may be dissolved in the solvent of the liquid composition or added in a state of an emulsion or suspension.

A surfactant may be added to the liquid composition to suitably control the surface tension of the liquid composition before use. Publicly known nonionic, cationic and anionic surfactants may be suitably selected for use as the surfactant as needed.

The content of the tannin compound in the liquid composition is favorably 0.1% by mass or more and 90% by mass or less, more favorably 1% by mass or more and 80% by mass or less, still more favorably 10% by mass or more and 70% by mass or less based on the total mass of the liquid composition. If the content is less than 0.1% by mass, sufficient viscosity increase may not be developed in some cases. If the content exceeds 90% by mass, the tannin compound may unevenly exist as an insoluble matter in the liquid composition in some cases according to the kind of the tannin compound. In this case, inconveniency may occur in some cases when the liquid composition is applied to form an ink image.

Application of Liquid Composition:

As a method for applying the liquid composition, various methods heretofore known may be suitably used. As examples thereof, die coating, blade coating, gravure roller coating and combinations of an offset roller with these coating methods may be mentioned. Use of an ink jet device is extremely favorable as a method capable of applying the liquid composition at a high speed with high accuracy. The application amount of the liquid composition is favorably 0.1 $g/m^2$ or more and 5.0 $g/m^2$ or less. If the amount is less than 0.1 $g/m^2$, the effect to inhibit bleeding may not be achieved in some cases. If the amount exceeds 5.0 $g/m^2$, there is a possibility that the feeling of the recording medium may be impaired by the application of the liquid composition.

Application of Ink:

The ink is then applied to the recording medium to which the liquid composition has been applied. No particular limitation is imposed on a method for applying the ink. However, for example, an ink jet device may be used. As examples of the ink jet device, the following modes may be mentioned:

A mode of causing film boiling in an ink by an electrothermal converter to form a bubble, thereby ejecting the ink;

A mode of ejecting an ink by an electromechanical converter; and

A mode of ejecting an ink by means of static electricity.

Besides the above, any of various ink jet devices proposed in ink jet liquid ejection technologies may be used. Among these, the mode of utilizing the electrothermal converter is favorably used from the viewpoint of high-speed and high-density printing in particular. No particular limitation is imposed on the mode of the whole ink jet device. For example, an ink jet head of a line head mode in which ink ejection orifices are arranged in a moving direction (an axial direction in the case of a drum shape) of the recording medium may be used. In addition, a head of a shuttle mode in which recording is conducted while scanning the head perpendicularly to a moving direction of the recording medium may also be used.

Ink:

The ink contains a compound having a polyoxyalkylene unit, and the containing form thereof may be any of a solution form dissolved in a solution and a dispersed form. As the ink, may be used a pigment ink widely used as an ink jet ink, for example, any of various inks with a coloring material such as carbon black or an organic pigment dispersed therein. Among these, a carbon black or organic pigment ink is particularly favorable because an image good in weather resistance and color developability is obtained. Specifically, a pigment indicated by a COLOR INDEX (C.I.) number may be used in the ink. In addition, an aqueous ink containing water as a component is favorable from the viewpoints of burden on an environment and odor upon use. In particular, an ink containing 45% by mass or more of water, or an ink in which a main component of a solvent is water is very favorable.

When the pigment is dispersed with a dispersant, a conventionally known dispersant used in ink jet, or a dispersant having the polyoxyalkylene unit may be used. As examples thereof, a polymer dispersant and a water-soluble surfactant may be mentioned. A natural polymer dispersant is favorable as the polymer dispersant, and a copolymer composed of a hydrophobic monomer and a hydrophilic monomer is favorable as a purely synthesized dispersant. The hydrophobic monomer is polymerized, whereby a hydrophobic group of the resulting resin can be formed, and the hydrophilic monomer is polymerized, whereby water solubility can be imparted to the resulting resin.

No particular limitation is imposed on the hydrophobic monomer usable for obtaining the resin having the hydrophobic group, and any publicly known hydrophobic monomer may be used. Specific examples of the hydrophobic monomer include styrene, styrene derivatives, benzyl acrylate and benzyl methacrylate. Any publicly known hydrophilic monomer may be used as the hydrophilic monomer without particular limitation. Specific examples of the hydrophilic monomer include acrylic acid, methacrylic acid and maleic acid. Such a copolymer may contain the polyoxyalkylene unit at an arbitrary amount ratio. However, the number of polyoxyalkylene units in its molecule is favorably 5 or more and 60 or less.

The weight-average molecular weight of the copolymer which is a polymer dispersant is within a range of favorably 1,000 or more and 50,000 or less, more favorably 3,000 or more and 30,000 or less. The amount of the polymer dispersant added into the ink may be set in such a range that the pigment can be stably dispersed without losing other effects of the present invention. Such polymer dispersants may be suitably added either singly or in any combination thereof. The mass ratio of the pigment to the dispersant is within a range of favorably from 1:006 to 1:3, more favorably from 1:0.125 to 1:3.

No particular limitation is imposed on the surfactant used as the pigment dispersant, and an anionic or nonionic surfactant may be used. The amount of the surfactant added as the dispersant may be set in such a range that the pigment can be stably dispersed without losing other effects of the present invention. Such surfactants may be suitably added either singly or in any combination thereof. When the surfactant contains the polyoxyalkylene unit, the number of polyoxyalkylene units in its molecule is favorably 5 or more and 60 or less.

No particular limitation is imposed on the pigment used in the ink so far as it is a pigment which can be used in an aqueous ink. Specifically, various pigments such as the following pigments can be used either singly or in any combination thereof.

A pigment of a type in which the pigment is dispersed with a dispersant (resin-dispersed type pigment);

A pigment of a type in which a hydrophilic group is introduced into a surface of a pigment particle (self-dispersible type pigment);

A pigment of a type in which an organic group containing a polymer is chemically bonded to a surface of a pigment particle to modify the pigment (resin-bonded type self-dispersible pigment); and A microcapsule type pigment which can be dispersed without using a dispersant by improving the dispersibility of a water-insoluble coloring material itself.

The proportion of the pigment to the total mass of the ink is favorably 0.1% by mass or more and 15% by mass or less, more favorably 0.5% by mass or more and 10% by mass or less.

Additives heretofore known may be added to the ink in addition to the pigment and the solvent. For example, a penetrant may be added for the purpose of adjusting the surface tension of the ink. In addition, the ink may contain various additives such as a pH adjustor, a rust preventive, a preservative, a mildewproofing agent, an antioxidant, an anti-reducing agent, a viscosity modifier, a water-soluble ultraviolet absorbent and a water-soluble infrared absorbent.

Any preservative or mildewproofing agents heretofore known may be used so far as they can be used in ink jet. Examples thereof include sodium benzoate, sodium pentachlorophenol, sodium 2-pyridinethiol-1-oxide, sodium sorbate, sodium dehydroacetate and 1,2-dibenzisothiazolin-3-one.

Any substance may be used as the pH adjustor so far as it adversely affects the ink prepared and can adjust the pH of the ink to a desired value. As examples thereof, hydroxides of alkali metals, such as lithium hydroxide, sodium hydroxide and potassium hydroxide, and carbonates of alkali metals, such as lithium carbonate, sodium carbonate and potassium carbonate may be mentioned.

Process of Removing Liquid Matter:

In this embodiment, an intermediate image formed of the ink and the liquid composition is temporarily formed on an intermediate transfer member, which is a kind of recording medium, by an inkjet recording method. The intermediate image on the intermediate transfer member is then dried to remove liquid matter in the intermediate image by viscosity increase or removal of a solvent in the intermediate image. No particular limitation is imposed on a method for removing the liquid matter. As examples thereof, a method in which air is blown against the intermediate image on the intermediate transfer member from a blower provided so as to oppose the surface of the intermediate transfer member, and a method in which the intermediate image is heated by a heater provided within the intermediate transfer member may be mentioned. The transferability of the intermediate image to the recording medium in a transfer process which will be described subsequently can be thereby improved.

Transfer Process:

After the liquid matter is removed, the intermediate image is transferred to a recording medium, whereby an image can be formed on the recording medium. As examples of the transfer process, a method in which the recording medium is pressed by a transfer roller and the intermediate transfer member at the time the intermediate image on the intermediate transfer member has come into contact with the recording medium while passing the recording medium through between the transfer roller and the intermediate transfer member may be mentioned.

Fixing Process:

As an additional process, the recording medium on which the image has been recorded may also be pressed by a fixing roller to improve the surface smoothness thereof. At that time, the fixing roller is favorably heated because the fastness properties of the image may be improved in some cases.

Recording Medium:

No particular limitation is imposed on the recording medium so far as it is poorly-permeable or non-permeable. General paper for printing, such as what is called woodfree paper, coat paper or art paper, which is mainly composed of cellulose and used in general offset printing, may be used. The general paper for printing mainly composed of cellulose has such properties that absorption and drying of the ink are relatively slow in image recording by an ink jet method using an aqueous ink, migration of a coloring material is easy to occur after impact of an ink droplet, and image quality is easy to be deteriorated. When the image recording method according to the present invention is used, however, the migration of the coloring material is inhibited, and a high-quality image without image shrinkage can be recorded.

The poorly-permeable or non-permeable recording medium means a recording medium which does not absorb a liquid composition therein upon recording. Specifically, the poorly-permeable or non-permeable recording medium means such a recording medium that the water absorption amount thereof at a contact time of 1 second according to the Bristow's method is 15 ml/m$^2$ or less.

Incidentally, no particular limitation is imposed on "recording medium" in the present invention so far as the liquid composition and the ink can be directly applied thereon. As examples thereof, paper which finally becomes a printed article and an intermediate transfer member may be mentioned. The intermediate transfer member provides a final printed article by transferring an intermediate image formed thereon and formed of the ink and the liquid composition to a printing object. Accordingly, the intermediate transfer member is not a printed article. In the present specification and the claims, however, such an intermediate transfer member is also included in "recording medium" so far as the liquid composition and the ink are directly applied thereon.

Incidentally, as such a recording medium that the water absorption amount thereof at a contact time of 1 second is 15 ml/m$^2$ or less, a commercially available recording medium may be used. As examples of the commercially available product of the recording medium, the following may be mentioned:

(a) Coat Paper A2, B2

"OK TOP COAT+" (product of Oji Paper Co., Ltd.; water absorption amount at 1 second: 4.5 ml/m$^2$), "AURORA COAT" (product of Nippon Paper Industries, Co., Ltd.; water absorption amount at 1 second: 8 ml/m$^2$), and "U-LITE" (product of Nippon Paper Industries, Co., Ltd.; water absorption amount at 1 second: 12 ml/m$^2$);

(b) Art Paper A1

"TOKUBISHI ART" (product of Mitsubishi Paper Mills Ltd.; water absorption amount at 1 second: 5 ml/m$^2$).

In addition, various kinds of photographic paper for ink jet recording of a type in which an image receiving layer is applied to a resin-coated paper coated with polyethylene may also be used.

Bristow's Method:

The Bristow's method is a method most utilized as a method for measuring a liquid absorption amount in a short period of time and is also adopted in JAPAN TECHNICAL ASSOCIATION OF THE PAPER AND PULP INDUSTRY (J'TAPPI). Details of the testing method can be found in the description of J'TAPPI No. 51 "Testing method for Liquid Absorbability of Paper and Paperboard" (Bristow's method). Briefly, the test may be carried out even by a dynamic scanning absorbed liquid meter described on pages 88 to 92 in JAPAN TAPPI JOURNAL, No. 48, May, 1994. In the present specification, the measurement is conducted by means of the above-described dynamic scanning absorbed liquid meter with a contact time of 1 second. Incidentally, a situation that an aqueous ink strikes through a back side of a recording medium is excluded from calculation.

The present invention will hereinafter be described specifically by Examples and Comparative Examples. The present invention is not limited by the following Examples unless going beyond the gist thereof. Incidentally, "parts" or "part" and "%" in the following are based on mass unless expressly noted.

(1) Image Recording Apparatus

Figure 3:
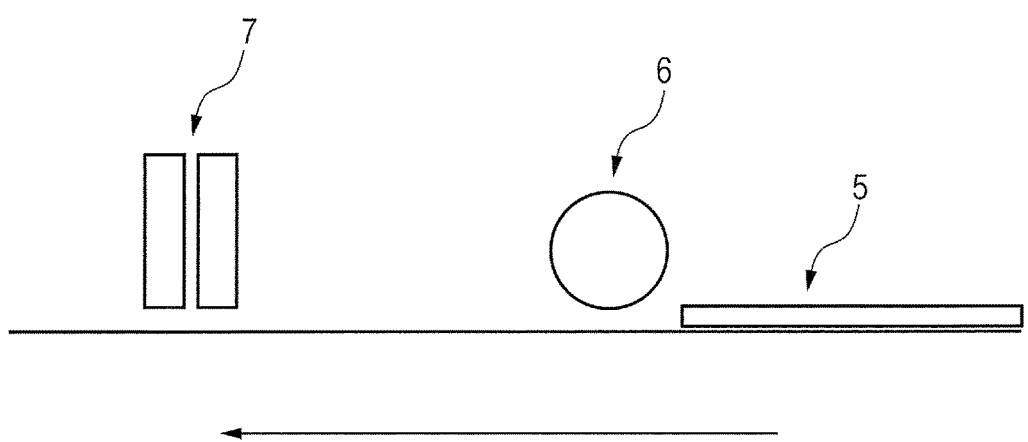
FIG. 3 illustrates a part of an image recording apparatus.

FIG. 3 typically illustrates a part of an image recording apparatus used in respective Examples and Comparative Examples. A liquid composition is first applied on to the surface of a recording medium 5 which is an intermediate transfer member by a roller type coater 6 while moving the recording medium 5 from the right to the left as illustrated by the arrow. Thereafter, an ink is ejected from an ink jet device 7 on the liquid composition applied to the recording medium 5 at the time the recording medium 5 has arrived just under the ink jet device 7 to form an intermediate image. Incidentally, a device of a type in which an ink is ejected by using an electrothermal element according to an on-demand system was used as the ink jet device 7. Thereafter, the intermediate image on the recording medium (intermediate transfer member) is transferred to a printing object by means of a transferring unit (not illustrated).

(2) Liquid Composition

Liquid compositions A to G were prepared by mixing and sufficiently stirring the respective components of compositions described in Table 1 and then filtering the resultant mixtures under pressure through a microfilter (product of Advantec Co., C300A) having a pore size of 3 μm.

TABLE 1

Preparation conditions for liquid compositions (unit: parts)

| Liquid composition No. | A | B | C | D | E | F | G |
|---|---|---|---|---|---|---|---|
| Glutaric acid | 0 | 20 | 30 | 1 | 5 | 25 | 29 |
| Tannic acid | 30 | 10 | 0 | 29 | 25 | 5 | 1 |
| Glycerol | 10 | 10 | 10 | 10 | 10 | 10 | 10 |
| Ion-exchanged water | 60 | 60 | 60 | 60 | 60 | 60 | 60 |

(3) Ink

Each ink ejected from the ink jet device 7 was prepared in the following manner.

Preparation of Pigment Dispersion Liquid 1:
Preparation of Black Pigment Dispersion Liquid Ten parts of carbon black having a specific surface area of 220 m$^2$/g and a DBP oil absorption of 105 ml/100 g, 30 parts of a styrene-acrylic acid copolymer (acid value: 200 mg KOH/g, weight-average molecular weight: 9,000, an aqueous solution having a solid content of 20%, neutralizer: potassium hydroxide) and 60 parts of pure water were mixed. A batch type vertical sand mill (manufactured by IMEX Co., Ltd.) was then charged with this mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a pigment dispersion liquid 1 having a pigment concentration of 10%.

Preparation of Pigment Dispersion Liquid 2:
Preparation of Black Pigment Dispersion Liquid Ten parts of carbon black having a specific surface area of 220 m$^2$/g and a DBP oil absorption of 105 ml/100 g, 30 parts of a 20% aqueous solution of NIKKOL BC15 (product of NIKKO CHEMICALS CO., LTD.) and 60 parts of pure water were mixed. NIKKOL BC15 corresponds to the compound having a polyoxyalkylene unit. A batch type vertical sand mill (manufactured by IMEX Co., Ltd.) was then charged with this mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a pigment dispersion liquid 2 having a pigment concentration of 10%.

Preparation of Pigment Dispersion Liquid 3:
Preparation of Black Pigment Dispersion Liquid Ten parts of carbon black having a specific surface area of 220 m$^2$/g and a DBP oil absorption of 105 ml/100 g, 30 parts of a 20% aqueous solution of NIKKOL BC5.5 (product of NIKKO CHEMICALS CO., LTD.) and 60 parts of pure water were mixed. NIKKOL BC5.5 corresponds to the compound having a polyoxyalkylene unit. A batch type vertical sand mill (manufactured by IMEX Co., Ltd.) was then charged with this mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a pigment dispersion liquid 3 having a pigment concentration of 10%.

Preparation of Pigment Dispersion Liquid 4:
Preparation of Black Pigment Dispersion Liquid Ten parts of carbon black having a specific surface area of 220 m$^2$/g and a DBP oil absorption of 105 ml/100 g, 30 parts of a 20% aqueous solution of NIKKOL BO50 (product of NIKKO CHEMICALS CO., LTD.) and 60 parts of pure water were mixed. NIKKOL BO50 corresponds to the compound having a polyoxyalkylene unit. A batch type vertical sand mill (manufactured by IMEX Co., Ltd.) was then charged with this mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a pigment dispersion liquid 4 having a pigment concentration of 10%.

Preparation of Pigment Dispersion Liquid 5:
Preparation of Black Pigment Dispersion Liquid Ten parts of carbon black having a specific surface area of 220 m$^2$/g and a DBP oil absorption of 105 ml/100 g, 30 parts of a 20% aqueous solution of AKYPO RLM100 (product of NIKKO CHEMICALS CO., LTD.) and 60 parts of pure water were mixed. AKYPO RLM100 corresponds to the compound having the polyoxyalkylene unit. A batch type vertical sand mill (manufactured by IMEX Co., Ltd.) was then charged with this mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a pigment dispersion liquid 5 having a pigment concentration of 10%.

Preparation of Yellow Pigment Dispersion Liquid

A yellow pigment dispersion liquid was prepared in the same manner as in the preparation of the black pigment dispersion liquids 1 to 5 except that 10 parts of carbon black used upon the preparation of the black pigment dispersion liquids were changed to 10 parts of C.I. Pigment Yellow 74.

Preparation of Polymer Fine Particle Dispersion Liquid 1:

Two parts of n-hexadecane, 10 parts of n-butyl acrylate and 2 parts of 2,2'-azobis-(2-methylbutyronitrile) were mixed and stirred for 0.5 hours. This mixture was added dropwise to 76 parts of a 5% aqueous solution of a styrene-acrylic acid copolymer (acid value: 120 mg KOH/g, weight-average molecular weight: 8,700; neutralizer: potassium hydroxide), and the resultant mixture was stirred for 0.5 hours. The mixture was then irradiated with ultrasonic waves for 3 hours by an ultrasonic wave irradiation machine. A polymerization reaction was then conducted for 4 hours at 80° C. under a nitrogen atmosphere to obtain a polymer fine particle dispersion liquid 1. The particle diameter of the resultant resin particle was 110 nm.

Preparation of Polymer Fine Particle Dispersion Liquid 2:

Two parts of n-hexadecane, 10 parts of n-butyl acrylate and 2 parts of 2,2'-azobis-(2-methylbutyronitrile) were mixed and stirred for 0.5 hours. This mixture was added dropwise to 76 parts of a 20% aqueous solution of NIKKOL BC15 (product of NIKKO CHEMICALS CO., LTD.), and the resultant mixture was stirred for 0.5 hours. The mixture was then irradiated with ultrasonic waves for 3 hours by an ultrasonic wave irradiation machine. A polymerization reaction was then conducted for 4 hours at 80° C. under a nitrogen atmosphere to obtain a polymer fine particle dispersion liquid 2. The particle diameter of the resultant resin particle was 168 nm.

Composition of Ink:

Inks 1 to 10 were prepared by mixing the respective materials described in Table 2 and then filtering the resultant mixtures under pressure through a membrane filter (product of Advantec Co., C300A) having a pore size of 3 μm.

TABLE 2

Preparation conditions for inks
(unit: parts)

| Ink No. | | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|---|
| Pigment dispersion liquid | Dispersion liquid 1 | 20.0 | 0 | 0 | 0 | 0 | 0 | 0 | 20.0 | 20.0 | 20.0 |
| | Dispersion liquid 2 | 0 | 20.0 | 20.0 | 20.0 | 0 | 0 | 0 | 0 | 0 | 0 |
| | Dispersion liquid 3 | 0 | 0 | 0 | 0 | 20.0 | 0 | 0 | 0 | 0 | 0 |
| | Dispersion liquid 4 | 0 | 0 | 0 | 0 | 0 | 20.0 | 0 | 0 | 0 | 0 |
| | Dispersion liquid 5 | 0 | 0 | 0 | 0 | 0 | 0 | 20.0 | 0 | 0 | 0 |
| Polymer particle dispersion liquid | Dispersion liquid 1 | 0 | 0 | 40.0 | 0 | 0 | 0 | 0 | 0 | 40.0 | 0 |
| | Dispersion liquid 2 | 40.0 | 40.0 | 0 | 0 | 0 | 0 | 0 | 0 | 0 | 0 |
| Surfactant | NIKKOL BC15*[1] | 0 | 0 | 0 | 0 | 0 | 0 | 0 | 10 | 0 | 0 |
| Glycerol | | 10.0 | 10.0 | 10.0 | 10.0 | 10.0 | 10.0 | 10.0 | 10.0 | 10.0 | 10.0 |
| Sodium dodecyl sulfate | | 0.1 | 0.1 | 0.1 | 0.1 | 0.1 | 0.1 | 0.1 | 0.1 | 0.1 | 0.1 |
| Ion-exchanged water | | 29.9 | 29.9 | 29.9 | 69.9 | 69.9 | 69.9 | 69.9 | 59.9 | 29.9 | 69.9 |

*[1]: Product of NIKKO CHEMICALS CO., LTD.

Image Recording Method:

The liquid composition A and any of the above-described inks were used to obtain printed articles of Examples 1 to 8 and Comparative Examples 1 and 2 according to the following method. Likewise, the liquid composition B and any of the above-described inks were used to obtain printed articles of Examples 9 to 16 and Comparative Examples 3 and 4. In addition, the liquid composition C and any of the above-described inks were used to obtain printed articles of Comparative Examples 5 to 14.

(A) Liquid Composition Application Process

A recording medium which is an intermediate transfer member was prepared in the following manner. Silicone rubber (product of Tigers Polymer Corporation, high-precision ultrathin SR sheet) was first applied to the surface of a PET film having a thickness of 0.5 mm so as to give a thickness of 0.2 mm. Thereafter, a parallel-plate type atmospheric pressure plasma treatment apparatus (manufactured by SEKISUI CHEMICAL CO., LTD., APT-203) was used to hydrophilize the surface of the thus-obtained recording medium. Any of the above-described liquid compositions A to C was applied to the above-described recording medium by means of a roll coater.

(B) Image Recording Process

Each of the inks was applied to the recording medium by an ink jet device (nozzle arrangement density: 1,200 dpi, ejection amount: 4 pl) using the ink to form an intermediate image having a desired pattern on the liquid composition applied to the recording medium.

(C) Transfer Process

After the intermediate image on the recording medium was dried, the intermediate image was brought into contact with a printing object (product of Mitsubishi Paper Mills Ltd., KINBISHI 127.9 g/m$^2$) by a pressure roller to transfer the intermediate image, thereby recording the intermediate image on the printing object to obtain a printed article.

(4) Image Evaluation

Image Shrinkage

One of the above-described inks was ejected from an ejection orifice array at a resolution of a fundamental matrix of 1,200 dpi (width)×1,200 dpi (length) to print 1 cm by 1 cm square solid images of 100% and 200% duties on the recording medium (intermediate transfer member). After 10 second from the printing, the intermediate images on the recording medium (intermediate transfer member) were visually observed, thereby evaluating the images as to image shrinkage according to the following criteria.

Evaluation Criteria

A: A solid image can be formed on the recording medium without image shrinkage;
B: Image shrinkage is scarcely caused on the recording medium, and the solid image is slightly disordered, but no problem is involved upon practical use;
C: Image shrinkage is caused on the recording medium, and no solid image can be formed.

Bleeding

The black inks and the yellow inks prepared in Examples 1 to 3 and Comparative Example 1 were used to evaluate the resulting printed articles as to bleeding. The evaluation of bleeding was made by printing solid printed images adjoiningly each other with the black and yellow inks under the same conditions and visually observing the state of a boundary portion between them. The evaluation criteria are as follows.

Evaluation Criteria

A: No bleeding is observed;
B: Bleeding is slightly observed, but it is a permissible level;
C: Bleeding is observed;
D: Bleeding is markedly observed.

Evaluation results of the image shrinkage and bleeding are shown in Tables 3-1 and 3-2.

TABLE 3-1

| | | Combination | Evaluation results | | |
|---|---|---|---|---|---|
| | | Liquid | Image shrinkage | | |
| Ex. No. | Ink No. | composition No. | 100% duty | 200% duty | Bleeding |
| Ex. 1 | Ink 1 | Liquid | A | A | B |
| Ex. 2 | Ink 2 | composition | A | A | A |

TABLE 3-1-continued

| | | Combination | Evaluation results | | |
|---|---|---|---|---|---|
| | | Liquid | Image shrinkage | | |
| Ex. No. | Ink No. | composition No. | 100% duty | 200% duty | Bleeding |
| Ex. 3 | Ink 3 | A | A | A | B |
| Ex. 4 | Ink 4 | | A | A | A |
| Ex. 5 | Ink 5 | | A | A | A |
| Ex. 6 | Ink 6 | | A | A | A |
| Ex. 7 | Ink 7 | | A | A | B |
| Ex. 8 | Ink 8 | | A | A | B |
| Comp. Ex. 1 | Ink 9 | | C | C | C |
| Comp. Ex. 2 | Ink 10 | | C | C | C |
| Ex. 9 | Ink 1 | Liquid | A | A | A |
| Ex. 10 | Ink 2 | composition | A | A | A |
| Ex. 11 | Ink 3 | B | A | A | A |
| Ex. 12 | Ink 4 | | A | A | A |
| Ex. 13 | Ink 5 | | A | A | A |
| Ex. 14 | Ink 6 | | A | A | A |
| Ex. 15 | Ink 7 | | A | A | A |
| Ex. 16 | Ink 8 | | A | A | A |
| Comp. Ex. 3 | Ink 9 | | C | C | A |
| Comp. Ex. 4 | Ink 10 | | C | C | A |
| Comp. Ex. 5 | Ink 1 | Liquid | A | B | D |
| Comp. Ex. 6 | Ink 2 | composition | A | A | D |
| Comp. Ex. 7 | Ink 3 | C | A | B | D |
| Comp. Ex. 8 | Ink 4 | | A | A | D |
| Comp. Ex. 9 | Ink 5 | | A | A | D |
| Comp. Ex. 10 | Ink 6 | | A | A | D |
| Comp. Ex. 11 | Ink 7 | | A | A | D |
| Comp. Ex. 12 | Ink 8 | | A | B | D |
| Comp. Ex. 13 | Ink 9 | | C | C | A |
| Comp. Ex. 14 | Ink 10 | | C | C | A |

TABLE 3-2

| | | Combination | Evaluation results | | |
|---|---|---|---|---|---|
| | | Liquid | Image shrinkage | | |
| Ex. No. | Ink No. | composition No. | 100% duty | 200% duty | Bleeding |
| Ex. 17 | Ink 1 | Liquid | A | A | A |
| Ex. 18 | Ink 3 | composition D | A | A | A |
| Ex. 19 | Ink 7 | | A | A | B |
| Ex. 20 | Ink 8 | | A | A | B |
| Ex. 21 | Ink 1 | Liquid | A | A | A |
| Ex. 22 | Ink 3 | composition E | A | A | A |
| Ex. 23 | Ink 7 | | A | A | A |
| Ex. 24 | Ink 8 | | A | A | A |
| Ex. 25 | Ink 1 | Liquid | A | A | A |
| Ex. 26 | Ink 3 | composition F | A | A | A |
| Ex. 27 | Ink 7 | | A | A | A |
| Ex. 28 | Ink 8 | | A | A | A |
| Ex. 29 | Ink 1 | Liquid | A | A | A |
| Ex. 30 | Ink 3 | composition G | A | A | A |
| Ex. 31 | Ink 7 | | A | A | B |
| Ex. 32 | Ink 8 | | A | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-139502, filed Jul. 3, 2013, which is hereby incorporated by reference herein in its entirety.

What is claimed is:

1. An image recording method comprising the steps of:
applying a liquid composition to a recording medium; and
applying an ink containing a pigment to the recording medium so as to overlap at least with a part of a region of the recording medium to which the liquid composition is applied,
wherein a water absorption amount of the recording medium at a contact time of 1 second according to the Bristow's method is 15 ml/m$^2$ or less,
wherein the ink contains water and a compound having a polyoxyalkylene unit,
wherein the liquid composition contains a tannin compound, and
wherein the content of the tannin compound in the liquid composition is more than 10% by mass and 80% by mass or less.

2. The image recording method according to claim 1, wherein the compound having the polyoxyalkylene unit is a dispersant having the polyoxyalkylene unit, and wherein the ink further contains a polymer fine particle dispersed by the dispersant.

3. The image recording method according to claim 1, wherein the compound having the polyoxyalkylene unit is a dispersant having the polyoxyalkylene unit, and wherein the pigment is dispersed by the dispersant.

4. The image recording method according to claim 1, wherein the polyoxyalkylene unit is at least one unit selected from the group consisting of the following general formulae (1) to (7):

$$-O-(CH_2CH_2O)_n- \quad (1),$$

$$-O-(CH_2CH_2CH_2O)_n- \quad (2),$$

$$-O-(CHCH_3CH_2O)_n- \quad (3),$$

$$-O-(CH_2CH_2CH_2O)_a-(CH_2CH_2O)_b- \; (a+b=n) \quad (4),$$

$$-O-(CH_2CH_2O)_a-(CH_2CH_2CH_2O)_b- \; (a+b=n) \quad (5),$$

$$-O-(CHCH_3CH_2O)_a-(CH_2CH_2O)_b- \; (a+b=n) \quad (6), \text{ and}$$

$$-O-(CH_2CH_2O)_a-(CHCH_3CH_2O)_b- \; (a+b=n) \quad (7),$$

wherein n is an integer of 5 to 60, and a and b are individually a positive integer.

5. The image recording method according to claim 1, wherein the tannin compound is tannic acid.

6. The image recording method according to claim 1, wherein the liquid composition further contains an organic acid, and wherein the content of the tannin compound in the liquid composition is 1/50 times or more and 30/1 times or less in terms of mass ratio with respect to the content of the organic acid.

7. The image recording method according to claim 1, wherein the content of the tannin compound in the liquid composition is more than 10% by mass and 30% by mass or less.

8. The image recording method according to claim 1, wherein the content of the tannin compound in the liquid composition is 25% by mass or more and 80% by mass or less.

9. The image recording method according to claim 1, wherein the content of the tannin compound in the liquid composition is 25% by mass or more and 30% by mass or less.

10. The image recording method according to claim 1, wherein the recording medium is non-permeable to water.

\* \* \* \* \*